(12) United States Patent
Li et al.

(10) Patent No.: US 9,641,346 B2
(45) Date of Patent: May 2, 2017

(54) METHOD AND APPARATUS FOR PERFORMING CHARGING CONTROL TO APPLICATION-LAYER DATA

(71) Applicant: Alcatel Lucent, Boulogne Billancourt (FR)

(72) Inventors: Xiangyang Li, Beijing (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 103 days.

(21) Appl. No.: 14/373,590

(22) PCT Filed: Jan. 21, 2013

(86) PCT No.: PCT/IB2013/000527
§ 371 (c)(1),
(2) Date: Jul. 21, 2014

(87) PCT Pub. No.: WO2013/108138
PCT Pub. Date: Jul. 25, 2013

(65) Prior Publication Data
US 2014/0376412 A1 Dec. 25, 2014

(30) Foreign Application Priority Data

Jan. 21, 2012 (CN) .......................... 2012 1 0020081

(51) Int. Cl.
*H04L 12/14* (2006.01)
*H04L 12/26* (2006.01)
(Continued)

(52) U.S. Cl.
CPC ........ *H04L 12/1407* (2013.01); *H04L 43/028* (2013.01); *H04L 45/3065* (2013.01);
(Continued)

(58) Field of Classification Search
CPC ..................... H04L 12/1407; H04L 45/3065
See application file for complete search history.

(56) References Cited

U.S. PATENT DOCUMENTS

2010/0043053 A1 2/2010 Wei et al.
2010/0142373 A1 6/2010 Jin et al.
(Continued)

FOREIGN PATENT DOCUMENTS

CN 101296092 A 10/2008
CN 102026139 A 4/2011
(Continued)

OTHER PUBLICATIONS

3rd Generation Partnership Project: Technical Specification Group Services and System Aspect; Policy and charging control architecture (Relase 11), 3GPP TS 23.203 V11.4.0 (Dec. 2011), pp. 1, 83-93 & 104-106.*
(Continued)

*Primary Examiner* — Albert T Chou
(74) *Attorney, Agent, or Firm* — Fay Sharpe, LLP (57) ABSTRACT

An objective of the present invention is to provide a method and apparatus for performing charging control to application-layer data. When a trigger condition is satisfied, a TDF transmits a first credit control request to an OCS, wherein the first credit control request includes a result of inspecting an application or application traffic by the TDF; the OCS determines charging control information for the application or application traffic based on the first credit control request to generate a credit control answer; the OCS transmits the credit control answer to the TDF. Compared with the prior art, in the present invention, the TDF detects an application or application traffic and provides the detection result to the OCS; the OCS determines charging control information to the application or application flow and returns it to the TDF, (Continued)

thereby realizing charging control to the application-layer data and improving the accuracy of the charging system.

17 Claims, 4 Drawing Sheets

(51) Int. Cl.
    *H04M 15/00*     (2006.01)
    *H04W 4/24*     (2009.01)
    *H04L 12/725*     (2013.01)

(52) U.S. Cl.
    CPC ............. *H04M 15/66* (2013.01); *H04W 4/24* (2013.01); *H04L 12/1467* (2013.01)

(56) References Cited

U.S. PATENT DOCUMENTS

| | | | |
|---|---|---|---|
| 2011/0067085 A1 | 3/2011 | Brouard et al. | |
| 2012/0220330 A1* | 8/2012 | Goldner | H04L 12/1407 455/517 |

FOREIGN PATENT DOCUMENTS

| | | |
|---|---|---|
| CN | 102131172 A | 7/2011 |
| CN | 102137367 A | 7/2011 |
| EP | 2 296 309 A1 | 3/2011 |
| WO | WO 2011/012165 A1 | 2/2011 |
| WO | 2011029636 A1 | 3/2011 |
| WO | WO 2012/077073 A1 | 6/2012 |

OTHER PUBLICATIONS $3^{rd}$ Generation Partnership Project; Technical Specification Group Services and System Aspects; Study on Policy solutions and enhancements (Release 11), SA WG2 V11.0.0, pp. 1-41, XP050552994, Jun. 2011.

English Bibliography for Chinese Patent Application Publication No. CN101296092A, published Oct. 29, 2008, printed from Thomson Innovation on Jun. 29, 2015, 3 pp.

English Bibliography for Chinese Patent Application Publication No. CN102026139A, published Apr. 20, 2011, printed from Thomson Innovation on Jun. 29, 2015, 4 pp.

English Bibliography for Chinese Patent Application Publication No. CN102131172A, published Jul. 20, 2011, printed from Thomson Innovation on Jun. 29, 2015, 3 pp.

English Bibliography for Chinese Patent Application Publication No. CN102137367A, published Jul. 27, 2011, printed from Thomson Innovation on Jun. 29, 2015, 3 pp.

TD S2-113302, Discussion paper on Usage-reporting from PCRF to OCS over Sy, 3GPP TSG SA WG2 Meeting #86, Jul. 11-15, Naantrali, Finland, 2 pp.

PCT Pat App No. PCT/IB2013/000527, Written Opinion of the International Searching Authority, mailed Jun. 12, 2013, 7 pp.

\* cited by examiner

METHOD AND APPARATUS FOR PERFORMING CHARGING CONTROL TO APPLICATION-LAYER DATA

FIELD OF THE INVENTION

The present invention relates to the field of communications technology, and more specifically, to a technology of performing charging control to application-layer data.

BACKGROUND OF THE INVENTION

3GPP has introduced Policy and Charging Control (PCC) architecture. In the latest version of the 3GPP TS23.203v11.0.1 (January, 2011), there is added a new node—Application Detection and Control (ADC) in the PCC architecture, which includes a Traffic Detection Function (TDF). The ADC/TDF detects application traffic and reports it to a PCRF. The TDF may be an independent device or integrated with a Policy and Charging Enforcement Function (PCEF). The PCC architecture including ADC/TDF addresses application-layer service policy issues based on a charging policy rule determined in PCRF. The PCC architecture introduces an Sd reference point residing between a Policy and Charging Rule Function (PCRF) and an individual ADC/TDF. Based on a ADC rule regardless of whether it is preset in the TDF or dynamically provided by the PCRF via the Sd reference point, the TDF can dynamically control the application detection and the service data flow.

However, the PCC architecture in the TS23.203v11.0.1 can not perform charging control to the application-layer data based on account information from an Online Charging System (OCS). There is no direct interface between TDF and OCS to support a charging-related policy decision. However, in 3GPP, most operators have a demand to perform charging control to application-layer data based on the PCC architecture.

Therefore, it becomes an imminent problem to those skilled in the art to resolve how to performing charging control to application-layer data based on the PCC architecture.

SUMMARY OF THE INVENTION

An objective of the present invention is to provide a method and apparatus for performing charging control to application-layer data.

According to one aspect of the present invention, there is provided a method for performing charging control to application-layer data based on Policy and Charging Control architecture, the method comprising:

a. when a trigger condition is satisfied, a TDF transmits a first credit control request to an OCS, wherein the first credit control request includes a result of inspecting an application or application traffic by the TDF;

b. the OCS determines charging control information for the application or application traffic based on the first credit control request to generate a credit control answer;

c. the OCS transmits the credit control answer to the TDF.

Preferably, the method further comprises:
the PCEF transmits a second credit control request to the OCS;

wherein, the step b comprises:
the OCS determines charging control information for the application or application traffic based on the second credit control request in combination with the first credit control request received from the TDF, so as to generate the credit control answer;

wherein, the step c comprises:
the OCS transmits the credit control answer to the PCEF.

More preferably, the trigger condition comprises at least any one of the following items:
the TDF receiving instruction information sent from a PCRF or the PCEF;
the TDF inspecting update information of the application or application traffic.

In a preferred embodiment, the method further comprises:
the PCRF transmits a charging status request to the OCS;
the OCS performs a matching query in a charging management database based on the charging status request so as to obtain user charging data and application policy data and returns them to the PCRF;
the PCRF determines a charging control rule for the application or application traffic based on the user charging data and application policy data, and transmits the charging control rule to the PCEF.

In another preferred embodiment, the method further comprises:
the OCS transmits the user charging data and application policy data to the PCRF;
the PCRF determines a charging control rule for the application-layer data based on the user charging data and application policy data, and transmits the charging control rule to the PCEF.

Preferably, the method further comprises:
the PCEF enforces the charging control rule based on the charging control rule received from the PCRF in combination with the charging control information received from the OCS.

Preferably, the method further comprises:
the PCRF transmits the charging control rule to the TDF;
the TDF performs at least any one of the following operations for the application or application traffic based on the charging control rule:
application traffic inspection;
application-layer QoS inspection;
application traffic report;
application gateway control;
application traffic redirection.

Preferably, the TDF performs application traffic redirection to the application or application traffic, wherein the method further comprises:
the TDF redirects the application or application traffic to PDN or AF based on the charging control rule in combination with inspection of the application or application traffic.

In a further preferred embodiment, the application or application traffic is terminated, wherein the method further comprises:
the PCEF transmits a charging control termination request to the PCRF based on an application termination message reported by the user equipment;
the PCRF removes the charging control rule based on the charging control termination request and returns a charging control termination answer to the PCEF;
the PCRF transmits a session termination request to the TDF;
the TDF terminates inspection of the application or application traffic based on the session termination request, and returns a session termination answer to the PCRF;
the PCEF transmits a charging balance to the OCS;

the OCS updates user account information based on the charging balance and returns a termination answer to the PCEF so as to terminate charging.

According to another aspect of the present invention, there is further provided a TDF for performing charging control to application-layer data based on Policy and Charging Control architecture, wherein the TDF performs the operation above.

According to a further aspect of the present invention, there is further provided an OCS for performing charging control to application-layer data based on Policy and Charging Control architecture, wherein the OCS performs the operation above.

According to another further aspect of the present invention, there is further provided a PCEF for performing charging control to application-layer data based on Policy and Charging Control architecture, wherein the PCEF performs the operation above.

Preferably, the PCEF comprises the TDF.

According to another further aspect of the present invention, there is further provided a PCRF for performing charging control to application-layer data based on Policy and Charging Control architecture, wherein the PCEF performs the operation above.

According to another further aspect of the present invention, there is further provided a system for performing charging control to application-layer data based on Policy and Charging Control architecture, comprising the TDF, OCS, PCEF, or PCRF above.

Compared with the prior art, in the present invention, the TDF detects an application or application traffic and provides the detection result to the OCS; the OCS determines charging control information to the application or application flow and returns it to the TDF, thereby realizing charging control to the application-layer data and improving the accuracy of the charging system.

BRIEF DESCRIPTION OF THE SEVERAL VIEWS OF THE DRAWINGS

Other features, objectives and advantages of the present invention will become more apparent through reading the detailed description of the non-limiting embodiments with reference to the following accompanying drawings.

Same or like reference numerals in the figures represent the same or like components.

DETAILED DESCRIPTION OF THE INVENTION

Hereinafter, the present invention will be further described in detail with reference to the accompanying drawings.

Figure 1:
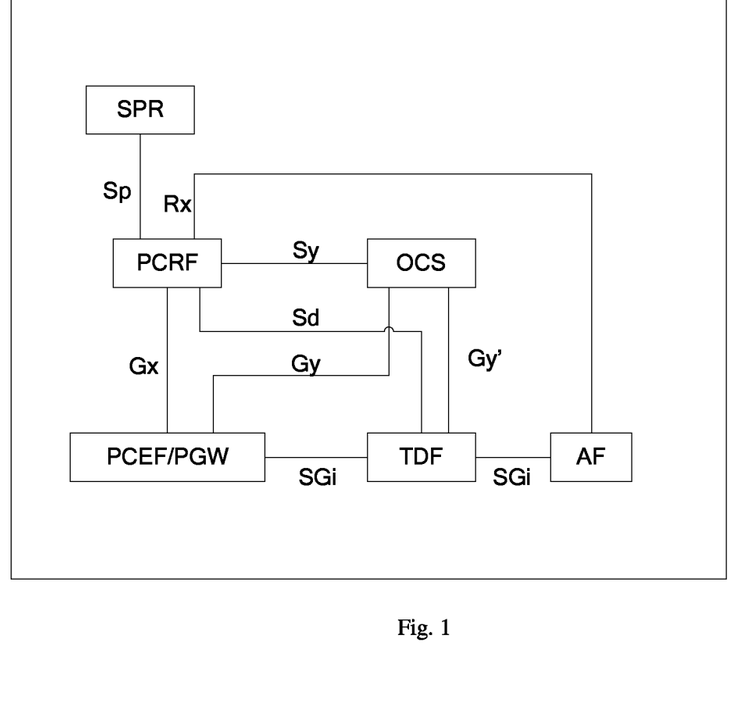
FIG. 1 shows a diagram of an apparatus for performing charging control to application-level data according to one aspect of the present invention.

FIG. 1 shows a diagram of an apparatus for performing charging control to application-layer data according to one aspect of the present invention; the PCC architecture comprises TDF, OCS, PCEF/PGW, PCRF, SPR, and AF. The PCC architecture has a reference point Gy' between TDF and OCS, and a reference point Sd between OCS and PCRF, and a reference point Sd between PCRF and TDF.

When a trigger condition is satisfied, the TDF transmits a first Credit Control Request (CCR) to the OCS, wherein the first credit control request comprises a result of detecting the application or application traffic by the TDF. Here, the application or application traffic will pass through the TDF, and the TDF performs a Deep Packet Inspection or a Shallow Inspection to the application or application traffic, wherein the Deep Packet Inspection, for example, performs inspection on stream media, P2P, VoIP, SMS, browsing, downloading, and multimedia, and the Shallow Inspection, for example, performs inspection on port, destination station, protocol, etc. The TDF, for example, transmits the first credit control request to the OCS via the Gy' interface. Here, the TDF may be an independent device or located in the PCEF.

Here, the trigger condition comprises at least one of the following items:
the TDF receiving instruction information sent from the PCRF or the PCEF;
the TDF inspecting update information of the application or application traffic.

For example, the PCEF transmits the instruction information to the TDF, and after receiving the instruction information, the TDF inspects the passing application or application traffic, and generates a first credit control request based on an inspection result, and further transmits the first credit control request to the OCS. Or, the PCRF transmits the charging control rule to the TDF. The charging control rule includes instruction information for inspecting the application or application traffic. After receiving the instruction information, the TDF inspects the passing application or application traffic, generates a first credit control request based on the inspection result, and further transmits the first credit control request to the OCS.

For another example, the TDF constantly inspects the application or application traffic passing through the TDF; when it is detected to update the application or application traffic, for example, the user changes the accessed application, the TDF can detect update of the application and thereby transmits a first credit request to the OCS, wherein the request includes update information of the application or application traffic as detected by the TDF.

Those skilled in the art should understand that the above trigger conditions are only exemplary, and other existing or possibly developed trigger conditions in the future, if applicable to the present invention, should also be included within the protection scope of the present invention, which are incorporated here by reference.

The OCS determines the charging control information for the application or application traffic based on the first credit control request to generate a Credit Control Answer (CCA). Specifically, the OCS parses out an inspection result for the application or application traffic from a particular field of the request based on the first credit control request received from the TDF, and determines the charging control information corresponding to the inspection result, for example, charging quota; preferably, the OCS further combines an application identifier, service type, user account information (balance type, available traffic plan), and other information stored in the OCS, to determine the charging control information for the application or application traffic, for example, charging quota; further, the OCS generates a credit control answer based on the charging control information.

Here, the OCS may further perform an operation corresponding to the inspection result based on the inspection result sent by the TDF, for example, when the application or application traffic reaches a predetermined monitor threshold, the OCS may perform different operations, for example, selecting an appropriate application charging policy, redirecting to the corresponding application page, reducing the quality of service QoS, filtering an application catalogue, or restricting access of a particular application, etc.

Here, the OCS may store different charging relevant information, for example, the OCS may comprise a charging management data base that stores user charging data and application policy data, such as a price list, discount information, user account information, etc., and the OCS determines corresponding charging control information based on the above charging relevant information. The charging management database may be built or updated based on the information provided by a user or a service provider.

Afterwards, the OCS transmits the credit control answer to the TDF. The credit control answer may either only indicate that the OCS receives the first credit control request sent by the TDF or may include the charging control information for the application or application traffic as determined by the OCS, for example, charging quota, etc. For example, the OCS transmits the credit control answer to the TDF via the Gy' interface.

Preferably, the PCEF transmits a second credit control request to the OCS, wherein the OCS determines the charging control information for the application or application traffic based on the second credit control request in combination with the first credit control request received from the TDF, so as to generate the credit control answer; the OCS transmits the credit control answer to the PCEF. In this embodiment, upon reception of the first credit control request sent from the TDF, the OCS caches the first credit request; afterwards, when the PCEF transmits the second credit control request to the OCS via the Gy reference point and, the OCS determines the charging control information for the application or application traffic in combination with the first credit control request and the second credit control request, or in further combination with the application identifier, service type, user account information (balance type, available traffic plan) and other information stored in the OCS, determines the charging control information for the application or application traffic, for example, charging quota, etc.; and then, the OCS generates a credit control answer based on the charging control information; next, the OCS transmits the credit control answer to the PCEF via the Gy interface.

In one preferred embodiment, the PCRF transmits the charging status request to the OCS; the OCS performs a matching query in the charging management database based on the charging status request to obtain user charging data and the application policy data, and returns them to the PCRF; the PCRF determines a charging control rule for the application or application traffic based on the user charging data and the application policy data, and transmits them to the PCEF. Here, the charging management database pre-stores user charging data and application policy data provided by the user or service provider, for example, a price list, an application ID, a gateway control standard, QoS and charging rate, discount information, and user account information, etc. Here, the PCRF obtains by PULL the corresponding user charging data and application policy data from the OCS through transmitting a charging status request.

Preferably, the PCRF transmits the charging status request to the OCS; the OCS performs a matching query in the charging management database based on the charging status request to obtain the charging policy being currently used by the OCS and returns the charging policy to the PCRF; afterwards, the PCRF updates the charging control rule for the application or application flow based on the charging policy, and transmits the updated charging control rule to the PCEF; the PCEF inspects the passing application or application traffic based on the updated charging control rule. Here, the OCS provides the user charging data and application policy data to the PCRF via the Sy reference point; and the PCRF provides the charging control rule to the PCEF via the Gx reference point.

In another preferred embodiment, the OCS transmits the user charging data and the application policy data to the PCRF; and the PCRF determines a charging control rule for the application-layer data based on the user charging data and the application policy data, and transmits it to the PCEF. Here, the OCS directly transmits the user charging data and the application policy data to the PCRF by PUSH, such that the PCRF determines the charging control rule for the application-layer data based on the user charging data and the application policy data.

Preferably, the PCEF enforces the charging control rule based on the charging control rule received from the PCRF in combination with the charging control information from the OCS. For example, the PECF receives that the charging control information sent from the OCS, for example, the charging quota, has a traffic of 200M, and enforces the charging control rule received from the PCRF, to charge the application-layer data.

Preferably, the PCRF transmits the charging control rule to the TDF; and the TDF performs at least any one of the following operations for the application for application traffic based on the charging control rule:

application traffic inspection;
application-layer QoS inspection;
application traffic report;
application gateway control;
application traffic redirection.

Here, the TDF receives the charging control rule sent from the PCRF via the Sd reference point, and performs for example application traffic inspection, QoS inspection, application traffic report, gateway control or application traffic redirection for the application or application traffic based on the rule. For example, when the TDF performs application traffic redirection for the passing application or application traffic, the TDF redirects the application or application traffic to the PDN or AF based on the received charging control rule sent from the PCRF in combination with the inspection result of the application or application traffic.

In a further preferred embodiment, the application or application traffic is terminated, wherein the PCEF transmits a charging control termination request to the PCRF based on an application termination message reported by a user equipment; the PCRF removes the charging control rule based on the charging control termination request, and returns a charging control termination answer to the PCEF; the PCRF transmits a session termination request to the TDF; the TDF terminates inspection of the application or application traffic based on the session termination request and returns a session termination answer to the PCRF; the PCEF transmits a charging balance to the OCS; the OCS updates user account information based on the charging balance and returns the termination answer to the PCEF to terminate charging.

Figure 2:
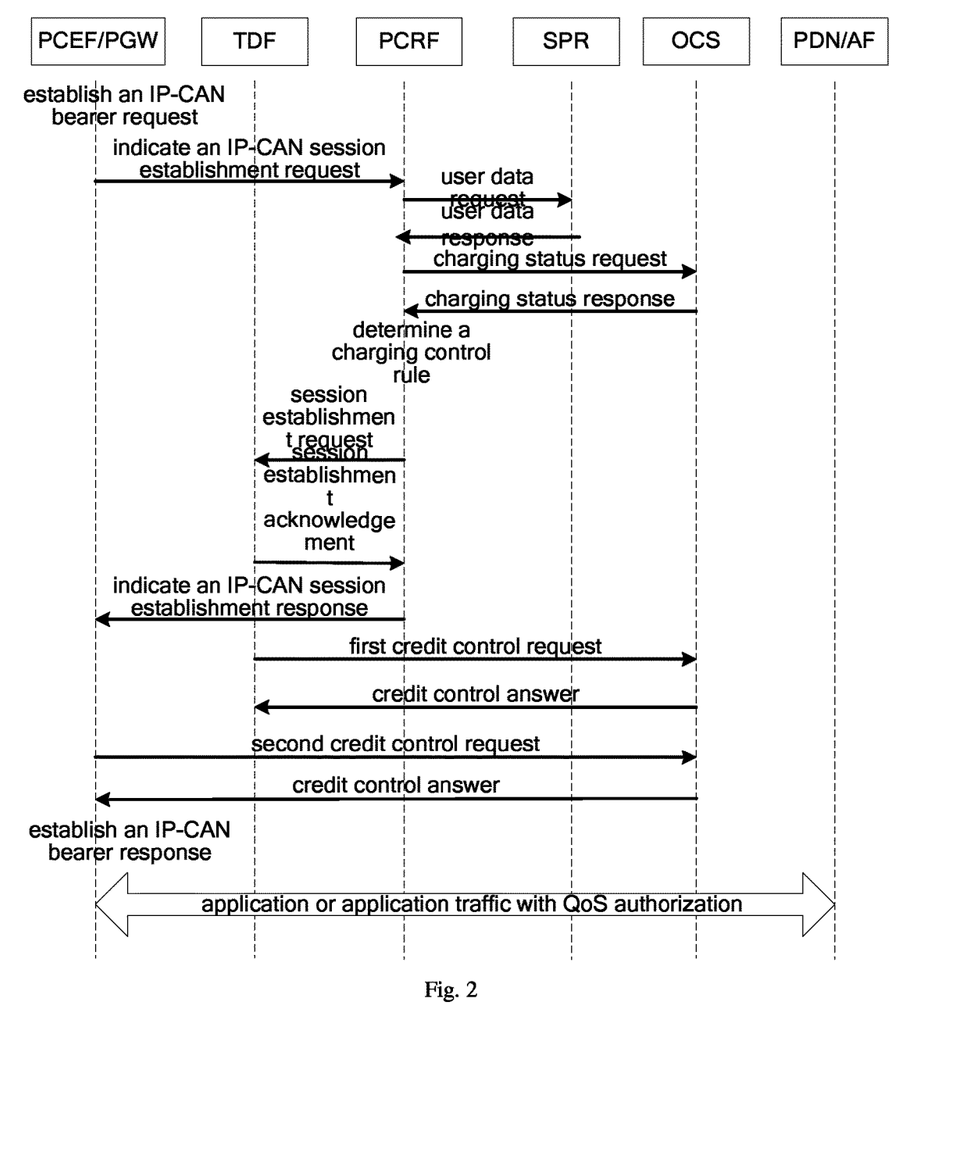
FIG. 2 shows a flowchart of a method for performing charging control to application-layer data according to another aspect of the present invention.

FIG. 2 shows a flowchart of a method for performing charging control to application-layer data according to another aspect of the present invention. FIG. 2 shows a call flow when the user equipment request for building an IP-CAN for the application-layer data via the PCC architecture.

With reference to FIG. 2, 1) the user equipment initiates a request for building an IP-CAN bearer to the PGW so as to build an IP-CAN for the application traffic in the LTE network via eNB and SGW.

2) The PGW/PCEF transmits a CCR initial message to the PCRF via the Gx reference point so as to initiate an IP-CAN session building for the application-layer data and requests for authenticating the application-layer data.

3) When the PCRF receives the CCR initial message through the Gx reference point, the PCRF transmits a user data request to a Subscription Profile Repository (SPR) via the Sp reference point to request for user data. The PCRF may determine a corresponding charging control rule based on the user data.

4) The SPR receives the user data request, performs a matching query, and obtains the user data, and then transmits a user data response to the PCRF via the Sp reference point, wherein the user data response includes user data obtained from the SPR matching. Here, the SPR includes information relating to all users or contracts with all these users, for example, user-allowed traffics, priority level of each allowed traffic, user-allowed QoS information, user type, charging relevant information of the user traffics (for example, access type, location information, and use times, etc.). The SPR may update based on the application URL address provided by the service provider or the user information provided by the user.

5) The PCRF transmits a charging status request to the OCS via the Sy reference point so as to request for user account data and application policy data.

6) The OCS receives the charging status request, performs a matching query in the charging management database to obtain user charging data and application policy data (for example, application charging rate, QoS, gateway control, and other information), further generates a charging status response based thereupon, and returns the response to the PCRF. Here, the charging management database pre-stores user charging data and application policy data provided by the user or service provider, for example, a price list, an application ID, a gateway control standard, QoS and charging rate, discount information, and user account information, etc.

7) The PCRF receives the user charging data and application policy data provided by the OCS and determines a charging control rule for the application or application traffic.

8) The PCRF transmits a session establishment request to the TDF via the Sd reference point, wherein the session establishment request includes the charging control rule.

9) The TDF receives the charging control rule and performs inspection of the application or application traffic based on the rule, and further, returns a session establishment acknowledge to the PCRF via the Sd reference point.

10) The PCRF returns a CCA initial message to the PGW/PCEF via the Gx reference point, the CCA initial message including a charging control rule to authorize establishment of the IP-CAN session.

11) The TDF transmits a first credit control request to the OCS via the Gy' reference point, the first credit control request including an inspection result of the application or application traffic by the TDF.

12) The OCS transmits a credit control answer to the TDF via the Gy' reference point, wherein the credit control answer for example may comprise charging control information for the application or application traffic, for example, charging quota. The TDF, for example, inspects the application or application traffic based on the credit control answer, and generates an inspection result to report it to the OCS.

13) The PGW/PCEF enforces the charging control rule received from the PCRF, and transmits a second credit control request to the OCS via the Gy reference point.

14) The OCS runs a charging engine based on the second credit control request in combination with the first credit control request received from the TDF, determines charging control information, and further generates a credit control answer based on the charging control information, and returns the answer to the PCEF.

15) The PCEF enforces the charging control rule received from the PCRF based on the charging control information. The PGW acknowledges establishment of the IP-CAN bearer.

16) Implement the application or application traffic with QoS authentication to PDN/AF. Here, the AF has different application URLs, each application URL being mapped to a corresponding application ID.

Figure 3:
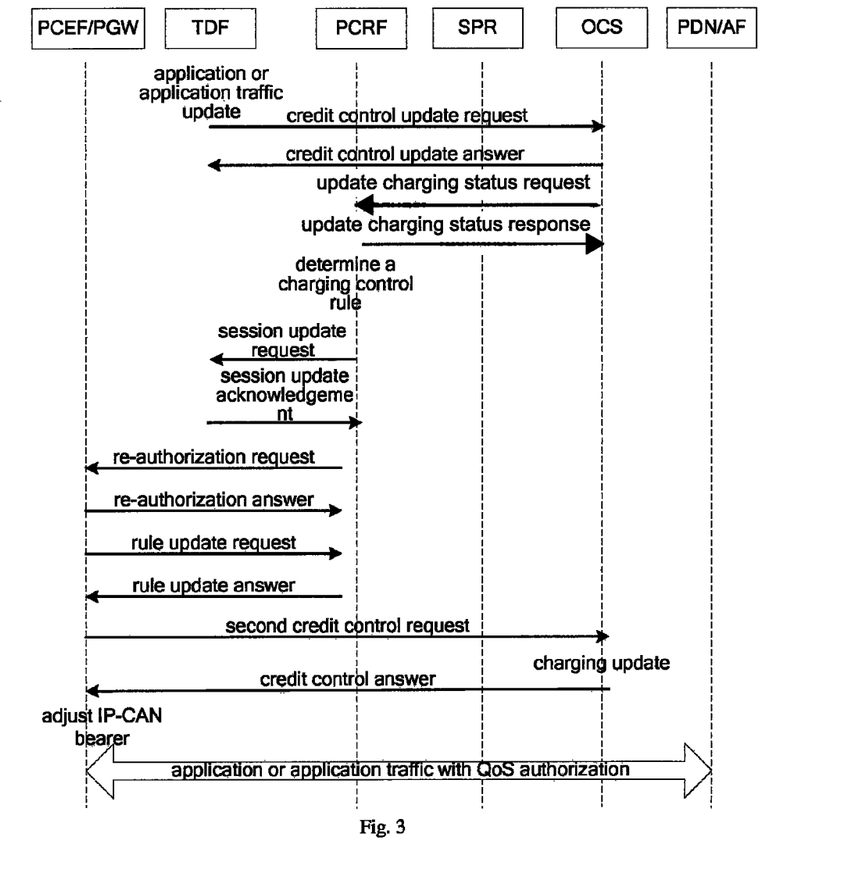
FIG. 3 shows a flowchart of a method for performing charging control to application-layer data according to a preferred embodiment of the present invention.

FIG. 3 shows a flowchart of a method for performing charging control to application-layer data according to a preferred embodiment of the present invention. FIG. 3 shows a flowchart when the TDF detects an application change.

With reference to FIG. 3, 1) A TDF performs application gateway control during the initial establishment process of the application or application flow. The TDF constantly inspects the application or application traffic passing through the TDF to inspect whether the application or application traffic has an update.

2) When the TDF detects that application or application traffic performs update, the TDF transmits a first credit control request to the OCS via a Gy' reference point, the request including update information of the application or application traffic as detected by the TDF.

3) The OCS receives the first credit control request, parses out the update information from a particular field of the request, and caches the update information to the database of the OCS; and further, transmits a credit control answer to the TDF via the Gy' reference point.

4) The OCS applies an internal policy to obtain user charging data and application policy data, for example, an application charging rate, QoS, gateway control, and other information, and further generates an updating charging status request based thereupon, and transmits the request to the PCRF via a Sy reference point.

5) The PCRF transmits an updating charging status response to the OCS via the Sy reference point.

6) The PCRF determines to update the charging control rule for the application or application traffic. Here, the PCRF might already receive an inspection result regarding a change of the application or application traffic from the TDF, and determines to update the charging control rule for the application or application traffic in combination with the inspection result.

7) The PCRF transmits a session update request to the TDF via the Sd reference point, the session update request including the updated charging control rule.

8) The TDF receives the updated charging control rule, and re-sets a rule for inspecting the application or application traffic.

9) The PCRF transmits a Re-Authorization Request (RAR) to the PGW/PCEF via the Gx reference point.

10) The PGW generates a Re-Authorization Answer (RAA) based on the Re-Authorization Request RAR and transmits it to the PCRF.

11) The PGW transmits a rule update request to the PCRF via the Gx reference point to query the updated charging control rule.

12) The PCRF returns a rule update answer to the PCEF based on the rule update request, the answer including an updated charging control rule.

13) The PCEF enforces the updated charging control rule, and transmits a second credit control request to the OCS via the Gy reference point.

14) The OCS determines charging control information for the application or application traffic based on the second credit control request in combination with the credit control update request received from the TDF. For example, the OCS determines a corresponding charging quota based on the updated charging control rule included in the second credit control request in combination with the credit control update request and the user's available balance and the selected price stored in the OCS.

15) The OCS generates a credit control answer based on the charging quota and returns it to the PGW via the Gy reference point.

16) The PGW adjusts the IP-CAN bearer path.

17) The application or application traffic is updated to the PDN/AF based on the new QoS or other relevant parameter.

Figure 4:
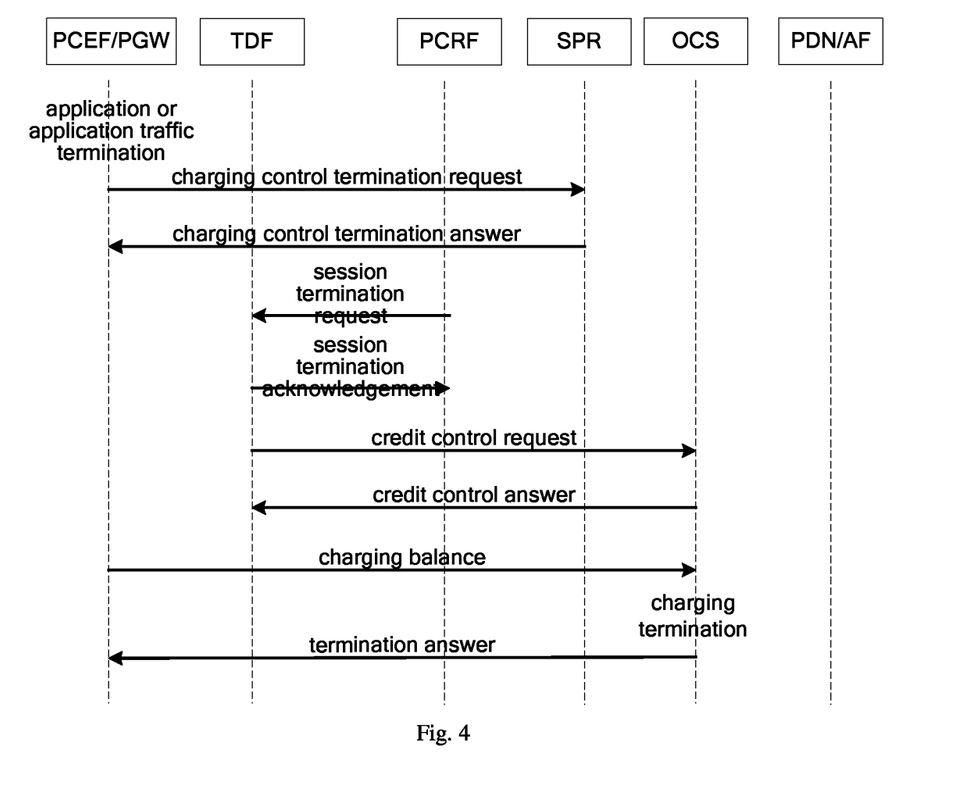
FIG. 4 shows a flowchart of a method for performing charging control to application-layer data according to another preferred embodiment of the present invention.

FIG. 4 shows a flowchart of a method for performing charging control to application-layer data according to a preferred embodiment of the present invention. FIG. 4 shows a flow of terminating the IP-CAN.

Referring to FIG. 4, 1) the user equipment transmits a request to the PGW to terminate the IP-CAN.

2) The PCEF transmits a charging control termination request to the PCRF based on the application termination message reported by the user equipment.

3) The PCRF removes the charging control rule based on the charging control termination request and returns a charging control termination answer to the PCEF.

4) The PCRF transmits a session termination request to the TDF.

5) The TDF terminates inspection of the application or application traffic based on the session termination request, and returns a session termination answer to the PCRF.

6) The TDF transmits a credit control request to the OCS.

7) The OCS returns a credit control answer to the TDF.

8) The PCEF transmits a charging balance to the OCS.

9) The OCS updates user account information based on the charging balance and terminates charging.

10) The OCS returns a termination answer to the PCEF.

To those skilled in the art, it is apparent that the present invention is not limited to the details of above exemplary embodiments, and the present invention can be implemented with other specific embodiments without departing the spirit or basic features of the present invention. Thus, from any perspective, the embodiments should be regarded as illustrative and non-limiting. The scope of the present invention is limited by the appended claims, instead of the above description. Thus, meanings of equivalent elements falling within the claims and all variations within the scope are intended to be included within the present invention. Any reference numerals in the claims should be regarded as limiting the involved claims. Besides, it is apparent that such terms as "comprise" and "include" do not exclude other units or steps, and a single form does not exclude a plural form. The multiple units or modules as stated in apparatus claims can also be implemented by a single unit or module through software or hardware. Terms such as first and second are used to represent names, not representing any specific sequence.

What is claimed is:

1. A method for performing charging control to application-layer data based on Policy and Charging Control architecture, the method comprising:
   when a trigger condition is satisfied, a Traffic Detection Function (TDF) transmits a first credit control request to an Online Charging System (OCS), wherein the first credit control request includes a result of inspecting an application or application traffic by the TDF;
   wherein the OCS determines charging control information for the application or application traffic based on the first credit control request to generate a credit control answer; and
   the OCS transmits the credit control answer to the TDF;
   wherein the trigger condition comprises at least any one of the following items:
   the TDF receiving instruction information sent from a Policy and Charging Rule Function (PCRF) or a Policy and Charging Enforcement Function (PCEF);
   the TDF inspecting update information of the application or application traffic.

2. The method according to claim 1, wherein the method further comprises:
   the PCEF transmits a second credit control request to the OCS;
   wherein, the OCS determining charging control information further comprises:
   the OCS determines charging control information for the application or application traffic based on the second credit control request in combination with the first credit control request received from the TDF, so as to generate the credit control answer;
   wherein, the method further comprises:
   the OCS transmits the credit control answer to the PCEF.

3. The method according to claim 1, wherein the method further comprises:
   the PCRF transmits a charging status request to the OCS;
   the OCS performs a matching query in a charging management database based on the charging status request so as to obtain user charging data and application policy data and returns them to the PCRF;
   the PCRF determines a charging control rule for the application or application traffic based on the user charging data and application policy data, and transmits the charging control rule to the PCEF.

4. The method according to claim 3, wherein the method further comprises:
   the PCEF enforces the charging control rule based on the charging control rule received from the PCRF in combination with the charging control information received from the OCS.

5. The method according to claim 3, wherein the method further comprises:
   the PCRF transmits the charging control rule to the TDF;

the TDF performs at least any one of the following operations for the application or application traffic based on the charging control rule:
application traffic inspection;
application-layer QoS inspection;
application traffic report;
application gateway control;
application traffic redirection.

6. The method according to claim 5, wherein the TDF performs application traffic redirection to the application or application traffic, wherein the method further comprises:
the TDF redirects the application or application traffic to PDN or AF based on the charging control rule in combination with inspection of the application or application traffic.

7. The method according to claim 1, wherein the method further comprises:
the OCS transmits user charging data and application policy data to the PCRF;
the PCRF determines a charging control rule for the application-layer data based on the user charging data and application policy data, and transmits the charging control rule to the PCEF.

8. The method according to claim 1, wherein the application or application traffic is terminated, wherein the method further comprises:
the PCEF transmits a charging control termination request to the PCRF based on an application termination message reported by the user equipment;
the PCRF removes the charging control rule based on the charging control termination request and returns a charging control termination answer to the PCEF;
the PCRF transmits a session termination request to the TDF;
the TDF terminates inspection of the application or application traffic based on the session termination request, and returns a session termination answer to the PCRF;
the PCEF transmits a charging balance to the OCS;
the OCS updates user account information based on the charging balance and returns a termination answer to the PCEF so as to terminate charging.

9. The method according to claim 1, wherein the trigger condition comprises the TDF receiving instruction information sent from the PCRF or the Policy and PCEF.

10. The method according to claim 1, wherein the trigger condition comprises the TDF inspecting update information of the application or application traffic.

11. A Traffic Detection Function (TDF) for performing charging control to application-layer data based on Policy and Charging Control architecture, comprising at least one processor configured to:
when a trigger condition is satisfied, transmit a first credit control request to an Online Charging System (OCS), wherein the first credit control request includes a result of inspecting an application or application traffic by the TDF; and
receive a credit control answer from the OCS, wherein the credit control answer is based on the first credit control request;
wherein the trigger condition comprises at least any one of the following items:
the TDF receiving instruction information sent from a Policy and Charging Rule Function (PCRF) or a Policy and Charging Enforcement Function (PCEF);
the TDF inspecting update information of the application or application traffic.

12. An Online Charging System (OCS) for performing charging control to application-layer data based on Policy and Charging Control architecture, comprising at least one processor configured to:
when a trigger condition is satisfied, receive a first credit control request from a Traffic Detection Function (TDF), wherein the first credit control request includes a result of inspecting an application or application traffic by the TDF;
wherein the OCS determines charging control information for the application or application traffic based on the first credit control request to generate a credit control answer; and
the OCS transmits the credit control answer to the TDF;
wherein the trigger condition comprises at least any one of the following items:
the TDF receiving instruction information sent from a Policy and Charging Rule Function (PCRF) or a Policy and Charging Enforcement Function (PCEF);
the TDF inspecting update information of the application or application traffic.

13. A Policy and Charging Enforcement Function (PCEF) for performing charging control to application-layer data based on Policy and Charging Control architecture, comprising at least one processor configured to:
after a Traffic Detection Function (TDF) has transmitted a first credit request including a result of inspecting an application or application traffic by the TDF to an Online Charging System (OCS) when a trigger condition is satisfied, transmit a second credit control request to the OCS; and
receive a credit control answer from the OCS, wherein the credit control answer is based the second credit control request;
wherein the trigger condition comprises at least any one of the following items:
the TDF receiving instruction information sent from a Policy and Charging Rule Function (PCRF) or the PCEF;
the TDF inspecting update information of the application or application traffic.

14. A method for performing charging control to application-layer data based on Policy and Charging Control architecture, the method comprising:
when a trigger condition is satisfied, a Traffic Detection Function (TDF) transmits a first credit control request to an Online Charging System (OCS), wherein the first credit control request includes a result of inspecting an application or application traffic by the TDF;
wherein the OCS determines charging control information for the application or application traffic based on the first credit control request to generate a credit control answer; and
the OCS transmits the credit control answer to the TDF;
wherein the result of inspecting an application or application traffic by the TDF comprises a result of a shallow inspection.

15. The method according to claim 14, wherein the shallow inspection comprises an inspection on port.

16. The method according to claim 14, wherein the shallow inspection comprises an inspection on destination station.

17. The method according to claim 14, wherein the shallow inspection comprises an inspection on protocol.

* * * * *